United States Patent [19]

Warshawsky

[11] Patent Number: 4,582,445
[45] Date of Patent: Apr. 15, 1986

[54] QUICK RELEASE LOCKING ARTICULABLE JOINT

[76] Inventor: Jerome Warshawsky, 1322 Everitt Pl., Hewlett Harbor, N.Y. 11557

[21] Appl. No.: 694,407

[22] Filed: Jan. 24, 1985

[51] Int. Cl.⁴ .......................... F16C 11/00; F16D 1/12
[52] U.S. Cl. ......................................... 403/97; 403/146
[58] Field of Search .......................... 403/97, 146, 101

[56] References Cited

U.S. PATENT DOCUMENTS 1,410,325 3/1922 Kupferman .......................... 403/146
3,322,886 5/1967 Warshawsky .................. 403/146 X

FOREIGN PATENT DOCUMENTS 2658838 6/1978 Fed. Rep. of Germany ........ 403/97

Primary Examiner—Andrew V. Kundrat
Attorney, Agent, or Firm—Stephen E. Feldman

[57] ABSTRACT

A pair of joint halves each include substantially cylindrical joint portions and end portions. Aligned openings are formed through the joint portions to receive therethrough a connecting pin which connects the joint halves together into a articulable joint. The connecting pin includes teeth on its outer surface sized to mate with teeth formed in the aligned openings of the joint halves. The connecting pin has a locked condition wherein its teeth mate with the teeth of both the joint halves and thus prevent relative rotation thereof, and an unlocked condition wherein its teeth are not in mating engagement with the teeth of one of the joint halves thus permitting relative rotation of one joint half with respect to the other. In one embodiment a spring urges the connecting pin into its locked condition and an operating button, disposed at one end of the connecting pin, facilitates movement of the pin so that its teeth move out of mating engagement with the teeth on one of the joint halves. In another embodiment, a spring urges the connecting pin into a position wherein its teeth are out of mating engagement with the teeth on one joint half; while an operating button connected to an end of the connecting pin facilitates movement of the connecting pin so that its teeth mate with the teeth on both joint halves and latch the connecting pin in place.

17 Claims, 7 Drawing Figures

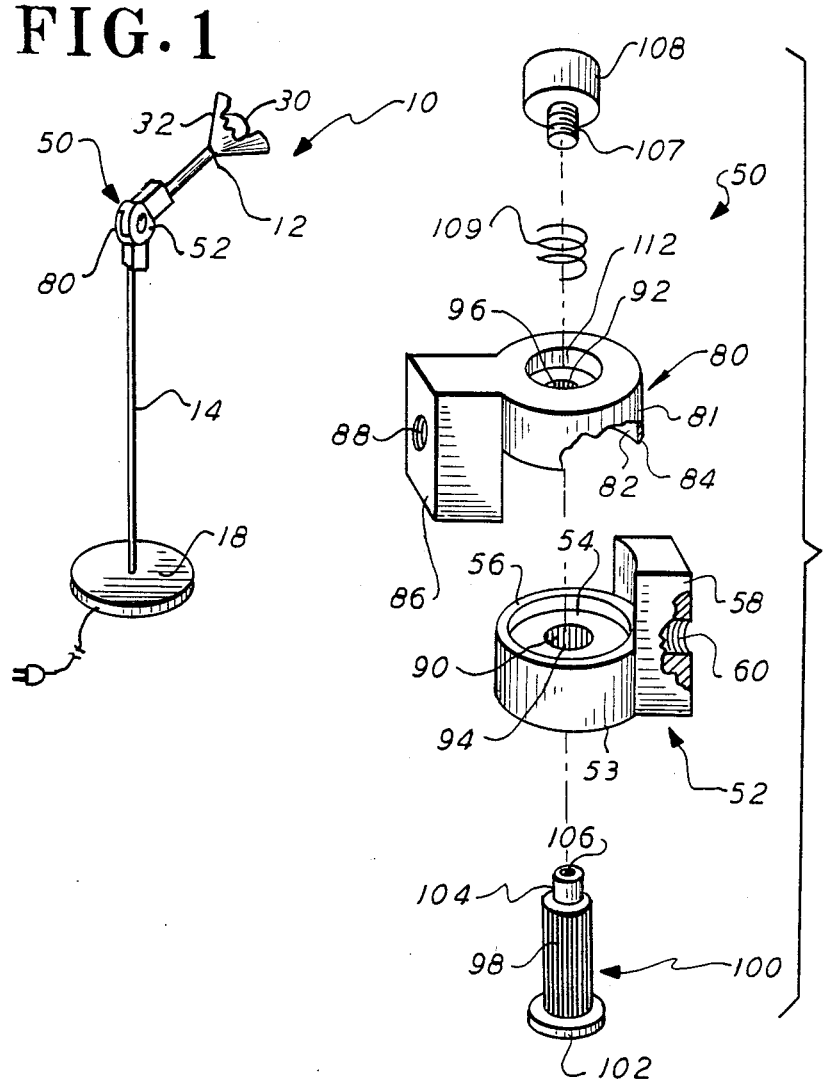
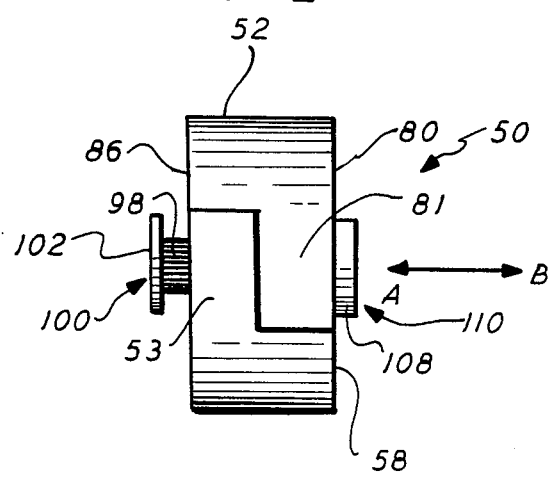
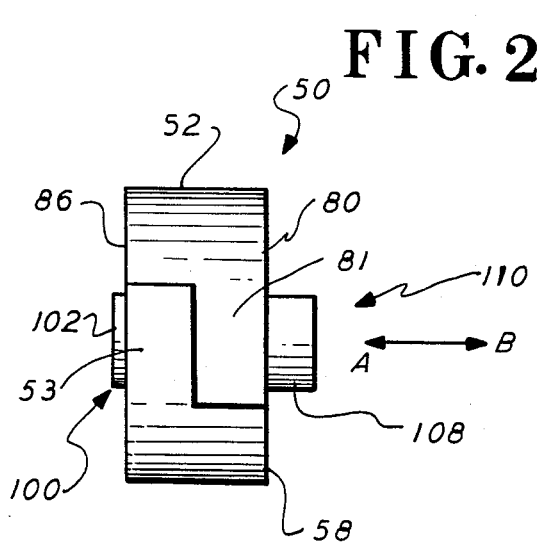

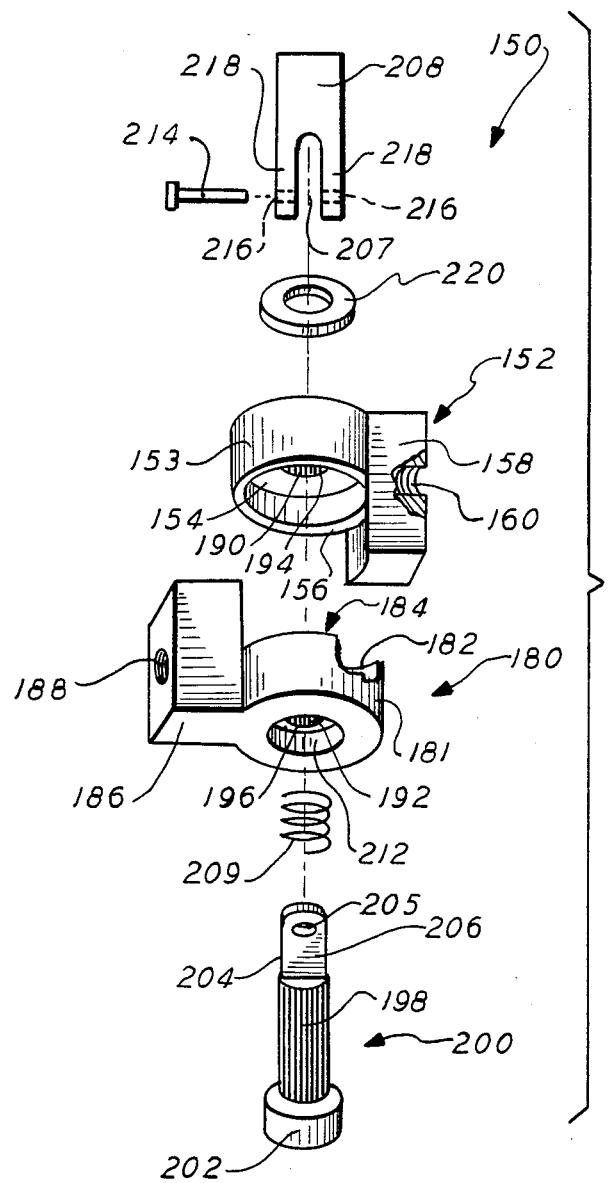
FIG. 6
FIG. 7
FIG. 5
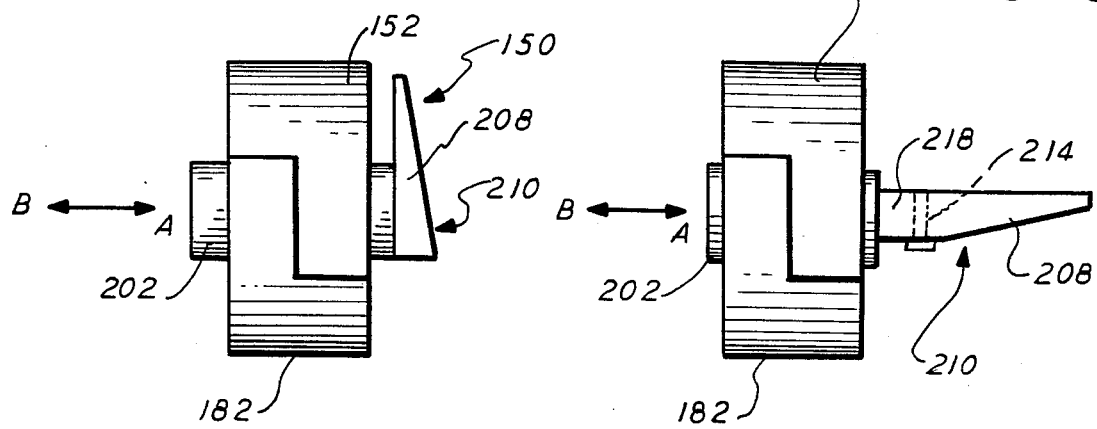

QUICK RELEASE LOCKING ARTICULABLE JOINT

BACKGROUND OF THE INVENTION

1. Field of Application

This invention relates to articulable joints; and more particularly, to joints rotatable about a predetermined axis of rotation between selective locked positions.

2. Description of the Prior Art

Articulable joints facilitate connecting two members together so that they can be moved with respect to each other about one or more predetermined axis of rotation. Some such joints are quite versatile permitting movement about plural axis of rotation; a first such axis of rotation; for example, passing through such members in a longitudinal direction; and a second such axis of rotation, for example, passing through such members in a transverse direction. Other articulable joints merely connect two members together for rotation about a single axis of rotation.

Many such articulable joints not only connect the two members together for selective positioning with respect to each other, but also provide means for locking or latching the joint in selected positions. Otherwise the weight of one or both such members, or something carried thereby, acting on the articulable joint will permit unwanted movement of one of such members with respect to the other (or both members with respect to each other). Some articulable joints are locked in position by friction type force application means, but many such locking means yield with time and wear and have failed to prove effective for the purpose. Other lockable articulable joints require the use of tools to release the lock. If the tool is not readily available, releasing the lock may become an inconvenience instead of a benefit of the joint.

Locking articulable joints are commonly utilized in lamp and lighting fixtures. Many lamps and lighting fixtures connect the lamp socket, into which the light bulb is screwed, to its carrying member (an arm or pole) by way of a joint that permits movement of the lamp socket about an axis of rotation perpendicular to an axis passing through the lamp socket carrying member. Quite often the lamp socket is disposed in a bullet or globe-like housing which is, in turn, connected to a carrying member by such a joint. Selective positioning of the housing, or bulb socket, of such units may require release of a locking device before being able to move the lamp unit, and subsequent tightening of the locking device after such movement if the lamp is to maintain its position. Quite often the locking device comprises friction type fittings which deteriorate with age and continued movement of the lamp carrying unit, and releasing and tightening of the locking device; or use of a screwdriver or other tool which is not readily available whenever the light needs re-positioning.

SUMMARY OF THE INVENTION

It is therefore an object of this invention to provide a new and improved locking articulable joint.

It is another object of this invention to provide a new and improved locking joint articulable about only one axis of rotation.

It is yet another object of this invention to provide a new and improved locking articulable joint which maintains its position while permitting quick release of the lock and selective movement of the joined members with respect to each other.

It is yet still another object of this invention to provide a new and improved quick release locking articulable joint for use with lamp and lighting units.

It is still a further object of this invention to provide a new and improved quick release locking articulable joint for facilitating selective positioning of a lamp carrying unit with respect to its mounting member.

It is yet still a further object of this invention to provide a new and improved quick release locking articulable joint for interconnecting a lamp unit to its carrying member so as to permit selective positioning of the lamp unit, with respect to its carrying member, about an axis of rotation perpendicular to an axis passing through the lamp unit.

It is yet still a further object of this invention to provide a new and improved quick release locking articulable joint for interconnecting a lamp unit to its carrying member so as to permit selective positioning of the lamp unit, and so as to maintain the lamp unit in position when so moved without the use of tools.

This invention involves a quick release locking articulable joint for interconnecting two members to each other so as to permit movement of said members with respect to each other about a predetermined axis of rotation; and contemplates forming the joint of two joint halves held together by connecting pin means, which passes through the joint halves to connect them together; and which has an axially sliding, but rotationally fixed fit with one joint half, and an axially sliding fit with the other joint half, and is slidable with respect thereto between a locked condition, wherein it locks the two joint halves against rotational movement with respect to each other, and an unlocked condition wherein one joint half is free to move with respect to the other. Said connecting pin means including biasing means urging same into a predetermined one of said conditions; and release means facilitating movement to the other condition.

The invention accordingly consists in the features of construction, combination of elements, and arrangement of parts which will be exemplified in the system, device, and article of manufacture hereinafter described, and of which the scope of application is as elucidated, supra, as will be indicated in the appended claims. In this regard, numerous alternatives within the scope of the present invention besides those alternatives, preferred embodiments or modes of practicing the invention, supra, and those to be elucidated, infra, will occur to those skilled in the art.

Other objects, features, and advantages of the invention in its details of construction and arrangement of parts will be seen from the above, from the following description of the preferred embodiment when considered wwith the drawings and from the appended claims.

BRIEF DESCRIPTION OF THE DRAWING

In the drawing

FIG. 1 is a perspective of a lamp incorporating the instant invention;

FIG. 2 is an enlarged showing of the articulable joint portion of the lamp of FIG. 1, showing same in the locked condition thereof;

FIG. 3 is an exploded view of the articulable joint of FIGS. 1 and 2;

FIG. 4 is a showing of the articulable joint of FIG. 2 but showing same in unlocked condition;

FIG. 5 is an enlarged showing of a modified articulable joint showing same in the locked condition thereof;

FIG. 6 is an exploded view of the articulable joint of FIG. 5; and

FIG. 7 is a showing of the articulable joint of FIG. 5 but showing same in unlocked condition.

DESCRIPTION OF THE PREFERRED EMBODIMENT

For convenience, the invention will be described as applied to the articulable joint for interconnecting the bulb socket to a support post for a base mounted electric lamp or lighting unit. The articulable joint is formed from two substantially cylindrical, substantially hollow, joint halves which are disposed with flat sides adjacent each other to provide a substantially cylindrical joint. A passage, coaxial with an axis or rotation perpendicular to said flat sides, and passing through the center of the cylinder, is formed to receive connecting pin means, which in turn, selectively either locks the joint halves together or permits movement of one with respect to the other. Internally threaded short end members are provided for each joint half for receiving externally threaded ends of the lamp members to be connected together.

It should be understood, nevertheless, that without departing from the scope of this invention: that the joint halves need not be cylindrical, but can be of any convenient configuration; that the joint halves need not be hollow; that the passage for the connecting pin means need not be perpendicular to surface along which the joint halves meet; that the connecting pin means can be of any other materials; that the lamp, or lighting unit, may be mounted to a wall, pole or other suitable mount; that the means for connecting the joint halves to the members to be connected need not be internally threaded members but can be of any suitable configuration; and that the articulable joint can be used to connect any suitable members of the lamp, or for that matter, any two members which are to be connected in an articulable manner.

With reference to FIG. 1, there is generally shown at 10 a lamp, or lighting unit, having a bulb socket 12 carried by a support post 14 which is, in turn, mounted on a lamp base 18. Bulb socket 12 receives a light bulb 30 and a shade 32 but can be positioned in a globe, bullet or other type housing if preferred. Lamp base 18 serves to position lamp 10 on the floor, but if support post 14 is otherwise sized, may mount same on a table, desk, dresser, or other article of furniture.

Lamp base 18, support post 14, bulb socket 12, bulb 30 and shade 32 are of conventional construction and formed from suitable materials such as metal, wood, glass, plastic, ceramic and the like. However, if preferred support post 14 may be secured by suitable means to an appropriate bracket for mounting bulb socket 12 to a wall or other such surface.

An articulable joint 50 (FIGS. 1-4) interconnects support post 14 and bulb socket 12 so as to permit rotation of bulb socket 12 with respect to support post 14 about a predetermined axis of rotation which, in this instance, is perpendicular to an axis through the longitudinal center of support post 14. A first half 52, of articulable joint 50, is formed with a substantially cylindrical joint portion 53, with a hollow 54 inside, and with a contact edge 56. A short squarish end piece 58 is provided with internal threads 60 to receive external threads (not shown) of support post 14 (FIG. 1), or any other member to be connected by articulable joint 50. If preferred, an otherwise suitably formed end piece, such as an externally threaded post or flat bracket, may be carried by first half 52 of articulable joint 50. A second half 80 (FIGS. 1-4) of articulable joint 50, is formed with a substantially cylindrical joint portion 81 with a relatively short, hollow 82 (FIG. 4) inside, and with a contact edge 84 formed for surface to surface cocation with contact edge 56 of joint half 52. A short squarish end piece 86 is provided with internal threads 88 to received external threads of lamp socket 12. End piece 86 of joint half 80 may be otherwise formed as explained above for joint half 52.

A passageway is formed through articulable joint 50 by providing a first opening 90 through joint half 52, and a second opening 92 through joint half 80 so as to be in axial alignment with opening 90.

The inside diameter of openings 90 and 92 are each formed with triangular teeth or splines 94, 96 respectively for coaction with triangular teeth or splines 98 formed in the outer surface of a connecting pin 100.

Connecting pin 100 is formed with an enlarged head 102 at one end, and a reduced end portion 104 at its other end. An internally threaded end opening 106 is formed into end portion 104 for coaction with external threaded stub 107 of an operating button 108. Connecting pin 100, operating button 108 and a spring 109 together form a connecting pin means or assembly 110. A recess 112 is formed in cylindrical portion 80 of a size and configuration to receive spring 109 and operating button 108.

To assemble articulable joint 50 contact edge 56, of first joint half 52, is disposed against contact edge 84 of second joint half 80, and connecting pin 100, of connecting pin means 110, is inserted through aligned opening 90 of first joint half 52 and then through aligned opening 92 of second joint half 80. When pin 100 is fully inserted through aligned openings 90, 92 its enlarged head 102 will seat up against cylindrical portion 53, and its end portion 104 will be disposed in recess 112 of cylindrical portion 81. Spring 109 is then disposed in recess 112 about end portion 104 and externally threaded stub 107 of operating button 108 is threaded into end opening 106 of end portion 104. When fully threaded into place operating button 108 will be partially disposed in recess 112 and will extend partially therefrom; and will have drawn joint halves 52, 80 and their respective contact edges 56, 84 firmly together.

External triangular teeth 98 of connecting pin 100 will mesh with internal triangular teeth 94, 96 respectively of aligned openings 90, 92 of joint halves 52, 80 and prevent relative rotation of one with respect to the other. The biasing action of spring 109 will maintain joint halves 52, 80 so locked together against relative rotation.

When it is desired to selectively move joint halves 52, 80 with respect to each other one need only move operating button 108 in the direction of arrow A (FIGS. 2 and 4) against the bias of spring 109 from the locked condition for connecting pin means 110 (FIG. 2) to the unlocked condition thereof (FIG. 4). This action slides connecting pin 100 in the direction of arrow A and moves triangular teeth 98 thereof from mating engagement with triangular teeth 96 of joint half 80. Joint halves 52, 80 may now be rotated with respect to each other about pin 100 to a new position. Release of button 108 permits spring 109 to urge same in the direction of arrow B (FIGS. 2 and 4) re-mating teeth 98 of pin 100 with teeth 96 of joint half 80. Joint halves 52, 80 are again locked in position.

It is important to note that no tools are required to lock and unlock articulable joint 50.

The members which are to be connected together by articulable joint 50, such as support post 14 and bulb socket 12, may be threaded into internally threaded end pieces 58, 86 of joint halves 52, 80 respectively either before joint halves 52, 80 are secured together as hereinabove described, or thereafter. If the members to be connected together are not susceptible of being formed with externally threaded ends, then the end pieces of joint halves 52, 80 may be otherwise suitably formed. Once so connected together the members may be moved with respect to each other by merely moving one or the other such member so that each joint half rotates about the axis of rotation of connecting pin 110. The coaction of joint halves 52, 80 is such that when locked the members should remain in their respective moved positions.

FIGS. 5-7 show at 150 an alternate articulable joint construction which may be utilized to interconnect support post 14 and bulb socket 12 so as to permit rotation of bulb socket 12 with respect to support post 14 about a predetermined axis of rotation which, in this instance, is perpendicular to an axis through the longitudinal center of support post 14. A first half 152, of articulable joint 150, is formed with a substantially cylindrical joint portion 153, with a hollow 154 inside, and with a contact edge 156. A short squarish end piece 158 is provided with internal threads 160 to receive external threads (not shown) of support post 14 (FIG. 1), or any other member to be connected by articulable joint 150. If preferred, an otherwise suitably formed end piece, such as an externally threaded post or flat bracket, may be carried by first half 152 of articulable joint 150. A second half 180 (FIGS. 5-7) of articulable joint 150, is also formed with a substantially cylindrical joint portion 81 with a relatively short, hollow 182 (FIG. 6) inside, and with a contact edge 184 formed for surface to surface cocation with contact edge 156 of joint half 152. A short squarish end piece 186 is provided with internal threads 188 to received external threads of lamp socket 12. End piece 86 of joint half 180 may be otherwise formed as explained above for joint half 152.

A passageway is formed through articulable joint 150 by providing a first opening 190 through joint half 152, and a second opening 192 through joint half 182 so as to be in axial alignment with opening 190.

The inside diameter of openings 190 and 192 are each formed with triangular teeth or splines 194, 196 respectively for coaction with triangular teeth or splines 198 formed in the outer surface of a connecting pin 200.

Connecting pin 200 is formed with an enlarged head 202 at one end, and a reduced end portion 204 at its other end. End portion 204 is also formed with a hole 205 and a pair of opposed flats 206 (only one shown) sized for disposition in a space 207 formed in an operating button 208. Connecting pin 200, operating button 208 and a spring 209 together form a connecting pin means or assembly 210. A recess 212 is formed in cylindrical portion 180 of a size and configuration to receive spring 209 and a portion of enlarged head 202 of pin 200.

A pin 214, inserted through suitable openings 216 formed in forked legs 218 of operating button 208 and through hole 205 of connecting pin 200 retains pin 200 in place as will be hereinafter explained. A washer 220 is disposed between piece 153 and button 208.

To assemble articulable joint 150 contact edge 156, of first joint half 152, is disposed against contact edge 184 of second joint half 180. Spring 209 is positioned in recess 212 and connecting pin 200, of connecting pin means 210, is inserted through spring 209 and aligned opening 190 of first joint half 152 and then through aligned opening 192 of second joint half 180.

When pin 200 is fully inserted through aligned openings 190, 192 its enlarged head 202 will seat in recess 212. Spring 209 will be compressed and end portion 204 of pin 200 will extend out through joint half 152. Washer 220 is disposed thereabout and flats 206 of end portion 204 are seated between legs 218 of operating button 208. Pin 214 is inserted through aligned openings 216 in forked legs 218 and hole 205 of end portion 204 of connecting pin 200. The construction of operating lever button 208 is such that in the locking condition thereof (FIG. 5) the ends of forked ends 218 coact with the corresponding surface of joint half 152 and draw connecting pin 200 in the direction of arrow A (FIGS. 5 and 7) and against the action of spring 209. This draws end surfaces 156, 182 of joint halves 152, 180 firmly together. It also seats triangular teeth 198 of pin 200 in teeth 194 of joint half 152 and teeth 196 of joint half 180 to lock joint halves 152, 180 against rotation with respect to each other.

When it is desired to selectively move joint halves 152, 180 with respect to each other one need only move operating button 208 about pin 214 from its locked condition (FIG. 5) to its unlocked condition (FIG. 7). this permits spring 209 to slide pin 200 in the direction of arrow B (FIG. 7) withdrawing its teeth 198 from teeth 194 of joint half 152. Joint halves 152, 180 may now be rotated with respect to each other to new positions. Movement of operating button 208 back into its locked condition (FIG. 5) draws pin 200 in the direction of arrow A and against the action of spring 209. Teeth 198 again mate with teeth 194 and joint halves 152, 180 are locked together.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention. Other embodiments, forms, and modifications of the invention, coming within the proper scope and spirit of the appended claims, will of course readily suggest themselves to those skilld in the art. Thus, while there has been described what is at present considered to be the preferred embodiments of the invention, it will be obvious to those skilled in the art that various changes and modifications may be made therein, without departing from the invention, and it is, therefore aimed in the appended claims to cover all such changes and modifications as fall within the true spirit and scope of the invention, and it is understood that, although I have shown the preferred form of my invention, that various modifications may be made in the details thereof, without departing from the spirit as comprehended by the following claims.

I claim:

1. An articulable joint; comprising:
   (a) a first joint half formed with a first contact surface;
   (b) a second joint half formed witth a second contact surface;
   (c) said first contact surface and said second contact surface each being formed to be disposed one adjacent the other and so that said first joint half and said second joint half together form a joint;
   (d) a first passageway extending through said first joint half and said second joint half;
   (e) connecting pin means extending through said first passageway and connecting said first joint half and said second joint half together;
   (f) said connecting pin means having an unlocked condition wherein said first joint half and said second joint half may be rotated one with respect to the other about a predetermined axis of rotation passing through said connecting pin means, and a locked condition wherein said first joint half and said second joint half are locked against such relative rotation;
   (g) locking means carried by said first joint half, said second joint half, and said connecting pin means and coacting therewith in said locked condition for said connecting pin means to so lock said first joint half and said second joint half against said relative rotation;
   (h) said connecting pin means including biasing means for urging said connecting pin means into one of said conditions;
   (i) said connecting pin means further including operating button means for moving said connecting pin means into the other of said conditions;
   (j) a first hollow formed in said first joint half, and a second hollow formed in said second joint half, said first hollow and said second hollow being disposed one adjacent the other when said first contact surface of said first joint half is disposed adjacent said second contact surface of said second joint half;
   (k) said connecting pin means extending through said first hollow and said second hollow with clearance when so disposed one adjacent the other, so that a portion of said so disposed first hollow and second hollow remain unobstructed.

2. The articulable joint of claim 1, wherein said biasing means urges said connecting pin means into said locked condition and said operating button means is operable to move said connecting pin means into said unlocked condition.

3. The articulable joint of claim 2, wherein said operating button means is moved axially in the direction of said predetermined axis of rotation and coacts with said connecting pin means to move same coaxially.

4. The articulable joint of claim 3 wherein said first joint half includes a recess formed in a surface thereof opposite to said first contact surface, said biasing means being disposed between said recess and said operating button of said connecting pin means.

5. An articulable joint; comprising:
   (a) a first joint half formed with a first contact surface;
   (b) a second joint half formed with a second contact surface;
   (c) said first contact surface and said second contact surface each being formed to be disposed one adjacent the other and so that said first joint half and said second joint half together form a joint;
   (d) a passageway extending through said first joint half and said second joint half;
   (e) connecting pin means extending through said first passageway and connecting said first joint half and said second joint half together;
   (f) said connecting pin means having an unlocked condition wherein said first joint half and said second joint half may be rotated one with respect to the other about a predetermined axis of rotation passing through said connecting pin means, and a locked condition wherein said first joint half and said second joint half are locked against such relative rotation;
   (g) locking means carried by said first joint half, said second joint half, and said connecting pin means and coacting therewith in said locked condition for said connecting pin means to so lock said first joint half and said second joint half against said relative rotation;
   (h) said connecting pin means including biasing means for urging said connecting pin means into one of said conditions;
   (i) said connecting pin means further including operating button means for moving said connecting pin means into the other of said conditions;
   (j) said biasing means urging said connecting pin means into said unlocked condition and said operating button means is operable to move said connecting pin means into said locked condition.

6. The articulable joint of claim 5, wherein said operating button means is rotatable about an axis perpendicular to said predetermind axis of rotation and when so moved coacts with said connecting pin means to move same axially along said predetermined axis of rotation.

7. The articulable joint of claim 5, wherein said biasing means is a spring.

8. The articulable joint of claim 7, wherein said connecting pin means includes a connecting pin and said spring is disposed about a portion of said connecting pin.

9. The articulable joint of claim 8, wherein said locking means includes a plurality of teeth carried by said connecting pin and mating teeth carried by said first joint half and said second joint half; said connecting pin means being movable in said unlocked condition thereof, to move said teeth carried thereby out of mating engagement with said teeth carried by one of said joint halves.

10. The articulable joint of claim 5 wherein:
    (a) first connecting means are provided for said first joint half to connect same to the first one of two members to be connected together; and
    (b) second connecting means are provided for said second joint half to connect same to a second one of two members to be connected together.

11. The articulable joint of claim 10, wherein the first member and the second member to be connected together are respectively members of a lamp that are to be connected together for movement one with respect to the other.

12. The articulable joint of claim 11, wherein said first connecting means and said second connecting means are each respectively internally threaded relatively short members each secured to its respective joint half.

13. The articulable joint of claim 5, wherein said passageway is formed by providing a first opening through said first joint half and a second opening through said second joint half and so as to be aligned with said first opening.

14. The articulable joint of claim 13, wherein said first opening and said second opening are each formed with a toothed inner surface and said connecting pin means is formed with external teeth formed for mating engagement with said toothed inner surfaces to provide a sliding but non-rotative fit.

15. The articulable joint of claim 11, wherein said first member constitutes a lamp bulb socket and said second member constitutes a support arm from which said lamp bulb socket is to be rotatively supported.

16. The articulable joint of claim 5, wherein said first joint half and said second joint half are each formed to a substantially hollow, substantially cylindrical configuration.

17. The articulable joint of claim 5, wherein said passageway extends through said first joint half and said second joint half along an axis that is perpendicular to said contact surfaces.

* * * * *